(12) United States Patent
Rotso et al.

(10) Patent No.: US 11,976,755 B2
(45) Date of Patent: May 7, 2024

(54) PRESS FITTING FOR A PIPE JOINT AND ASSEMBLY GROUP FOR A PRESS FITTING

(71) Applicant: Uponor Innovation AB, Virsbo (SE)

(72) Inventors: Vesa Rotso, Lahti (FI); Gregor Sobota, Viereth (DE); Rainer Dittmar, Schweinfurt (DE)

(73) Assignee: Uponor Innovation AB, Virsbo (SE)

( * ) Notice: Subject to any disclaimer, the term of this patent is extended or adjusted under 35 U.S.C. 154(b) by 0 days.

(21) Appl. No.: 17/964,801

(22) Filed: Oct. 12, 2022

(65) Prior Publication Data

US 2023/0110392 A1 Apr. 13, 2023

(30) Foreign Application Priority Data

Oct. 13, 2021 (DE) .................. 202021105547.2

(51) Int. Cl.
*F16L 13/14* (2006.01)
*F16L 33/207* (2006.01)

(52) U.S. Cl.
CPC ......... *F16L 13/143* (2013.01); *F16L 33/2073* (2013.01); *F16L 33/2078* (2013.01)

(58) Field of Classification Search
CPC ....... F16L 13/143; F16L 13/14; F16L 13/141; F16L 33/2073; F16L 33/2078
See application file for complete search history.

(56) References Cited

U.S. PATENT DOCUMENTS

| | | | | |
|---|---|---|---|---|
| 6,874,823 B2 * | 4/2005 | Viegener | ............... | F16L 13/143 285/259 |
| 7,384,074 B2 * | 6/2008 | He | ........................ | F16L 13/143 285/259 |
| 8,141,913 B2 * | 3/2012 | Kern-Emmerich | ... | F16L 13/141 285/256 |
| 8,262,138 B2 | 9/2012 | Rischen et al. | | |
| 11,092,265 B2 * | 8/2021 | Schneider | ............. | F16L 13/141 |
| 2019/0186664 A1 | 6/2019 | Miller et al. | | |
| 2019/0331273 A1 | 10/2019 | Vos et al. | | |

FOREIGN PATENT DOCUMENTS

| | | |
|---|---|---|
| DE | 19542463 B4 | 5/2004 |
| DE | 102018109555 B3 | 10/2019 |
| EP | 1306601 A2 | 5/2003 |
| EP | 1790896 A1 | 5/2007 |
| EP | 1933073 B1 | 2/2010 |
| EP | 3645926 B1 | 4/2021 |
| WO | 2012069584 A2 | 5/2012 |

* cited by examiner

*Primary Examiner* — David Bochna
(74) *Attorney, Agent, or Firm* — Haynes Beffel & Wolfeld LLP; Andrew L. Dunlap (57) ABSTRACT

A press fitting for a pipe connection is provided. The press fitting comprises a fitting body for connecting the press fitting to a pipe, a substantially cylindrical pressing sleeve fixed to the fitting body and having a pressing area, and a stop ring fixed to the pressing sleeve and limiting the pressing area in an axial direction of the press sleeve. The stop ring has a substantially cylindrical inner contour with protruding first regions and second regions receding from the first regions. The first areas of the first stop ring encompass an outer contour of the pressing sleeve in a clamping manner. The second areas of the stop ring are spaced from the outer contour of the pressing sleeve.

14 Claims, 8 Drawing Sheets

PRESS FITTING FOR A PIPE JOINT AND ASSEMBLY GROUP FOR A PRESS FITTING

BACKGROUND OF THE INVENTION

Field of the Invention

The invention relates to a press fitting for a pipe connection, comprising a fitting body, a pressing sleeve and a stop ring. The invention further relates to an assembly group for such a press fitting.

Related Applications

This application claims priority to German application No. 202021105547.2, filed Oct. 13, 2021, which is incorporated by reference herein.

DESCRIPTION OF THE RELATED ART

Press fittings for pipe connections are known from the prior art. For example, a press fitting 101 for a pipe connection is known from DE 10 2018 109 555 B3, which is shown in FIG. 12.

Figure 12:
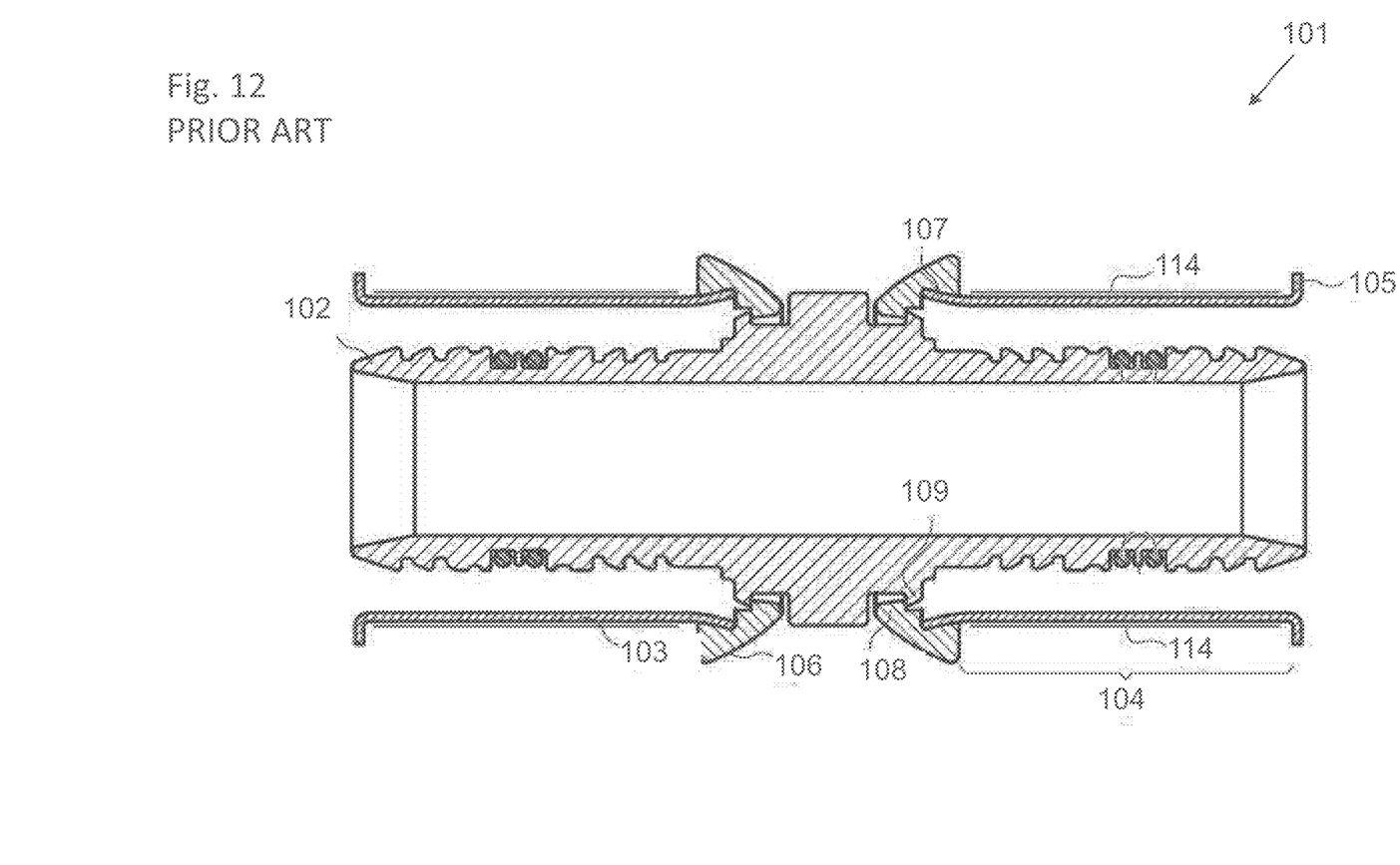
FIG. 12 shows a first press fitting according to the state of the art.

The press fitting 101 according to FIG. 12 has a fitting body 102 for connecting the press fitting 101 to a pipe, two press sleeves 103 fixed to the fitting body 102, each having a substantially cylindrical pressing area 104 and at least one protruding element in the form of a flange 105 which limits the substantially cylindrical pressing area 104 in the axial direction, and a tubular band 114 made of a plastic film. As can be seen in FIG. 12, each of the pressing sleeves 103 is fixed to the fitting body 102 by means of a retaining ring 106. For this purpose, the pressing sleeve 103 has a slightly flared area 107 at the proximal end, which is locked to the retaining ring 106. The retaining ring 106 is further latched to the fitting body 102 by two opposing latching tabs 108 and 109.

Figure 13:
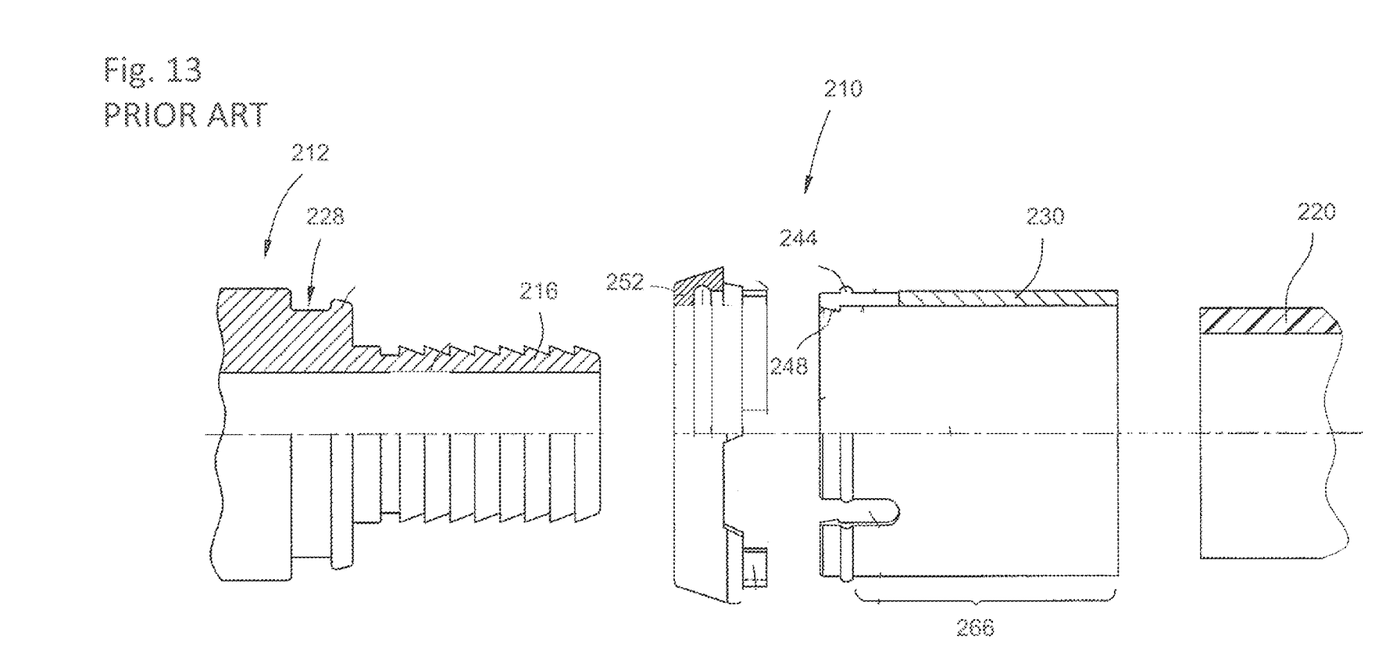
FIG. 13 shows a second press fitting according to the state of the art.

Furthermore, a press fitting 210 for a pipe, in particular a plastic pipe or a pipe made of a plastic-metal composite, is known from EP 1 790 896 A1, which is shown in FIG. 13.

The press fitting 210 of FIG. 13 is provided with a fitting body 212 having a support body 216 onto which a pipe 220 to be connected can be slid, a pressing sleeve 230 having a pressing area 266 in which a pressing tool acts on the pressing sleeve 230 when the pressing sleeve 230 is pressed, and a press indicator ring 252 held on an outer bead 244 of the pressing sleeve 230. The press fitting 210 of FIG. 13 differs from the press fitting 101 of FIG. 12, inter alia, in that an inner projection 248 of the pressing sleeve 230 dips directly into an outer peripheral recess 228 of the fitting body 212.

SUMMARY OF THE INVENTION

The present invention is based on the task of describing an improved press fitting which is preferably particularly easy to manufacture. In particular, a press fitting is to be described which enables the production of a permanent connection between a pressing sleeve and a stop ring which is insensitive to impacts, for example from a lateral direction, even during production and before pressing of the press fitting, and/or in which damage to individual parts, such as the fitting body, can be reduced or avoided during production.

According to a first aspect of the disclosure, a press fitting for a pipe connection is disclosed. The press fitting comprises a fitting body for connecting the press fitting to a pipe, a substantially cylindrical pressing sleeve fixed to the fitting body and having a pressing area, and a stop ring fixed to the pressing sleeve and limiting the pressing area in an axial direction of the press sleeve. Therein, the stop ring has a substantially cylindrical inner contour with protruding first regions and second regions receding from the first regions. The first areas of the first stop ring encompass an outer contour of the pressing sleeve in a clamping manner. The second areas of the stop ring are spaced from the outer contour of the pressing sleeve.

A stop ring designed in this way with an inner contour with protruding and recessed areas enables a secure clamping connection to be made, even taking into account possible tolerances of a press fitting. Such clamping holds the stop ring securely to a press sleeve, even before the pressing sleeve is mounted on the actual fitting body. This ensures, among other things, that the stop ring does not accidentally detach from the pressing sleeve before the pressing sleeve is mounted on the fitting body and before pressing.

In at least one embodiment, an inside diameter between the first regions is less than a predetermined outer diameter of the pressing sleeve minus a negative tolerance, and an inside diameter between the second regions is greater than the predetermined outer diameter plus a positive tolerance.

In at least one embodiment, the fitting body has a circumferential groove, and the pressing sleeve has, at a fitting-side (or proximal) first axial end, a radially inwardly facing first projection that engages the groove when fixed to the fitting body so that the pressing sleeve is directly fixed to the fitting body. Such a direct connection between the pressing sleeve and the fitting body, for example by latching the first projection to the circumferential groove, increases the stability of the press fitting after assembly of the pressing sleeve to the fitting body, for example against impacts from a lateral direction.

In at least one embodiment, the pressing sleeve has one or more slots extending from the first axial end toward the press area. Such slots facilitate the application of the pressing sleeve to the fitting body. In this regard, the recessed second portions of the stop ring facilitate bending open of the first end of the pressing sleeve when it is mounted on the fitting body.

According to one possible embodiment, the first and second areas are connected by arcuate transition areas. Such a shape is relatively easy to manufacture and at the same time ensures secure clamping of the stop ring on the press sleeve.

According to an alternative embodiment, the second areas are formed by a substantially cylindrical inner surface of the stop ring, and the first areas are formed by webs projecting from the inner surface. Such a design is particularly material-saving in manufacture and also ensures secure clamping of the stop ring.

According to a second aspect of the disclosure, an assembly group for a press fitting, in particular the press fitting according to the first aspect, is described. The assembly group comprises a substantially cylindrical pressing sleeve having a pressing region, and a stop ring fixed to a first axial end of the pressing sleeve and defining the pressing region in an axial direction of the press sleeve. Therein, the stop ring has a substantially cylindrical inner contour with projecting first regions and second regions receding from the first regions, the first regions of the stop ring clampingly engaging around an outer contour of the pressing sleeve and the second regions of the stop ring being spaced apart from the outer contour of the pressing sleeve.

In such an assembly group, a stop ring is particularly securely fixed to a pressing sleeve. Thus, the assembly group can be uncomplicatedly stored and, if necessary, transported before it is applied to a corresponding fitting body of a press fitting. According to a third aspect of the disclosure, an assembly group for a press fitting is described. The assembly group comprises a substantially cylindrical pressing sleeve having a pressing region, and a stop ring fixed to a first axial end of the pressing sleeve and defining the pressing region in an axial direction of the pressing sleeve. The stop ring has a first inner contour on a side opposite the pressing region for applying the assembly to a fitting body of the press fitting, and a first circular segment and a second circular segment adjacent thereto extending over a smaller portion of the first inner contour than the first circular segment. Further, the stop ring has a constant cross-section in the region of the first circular segment and an element disposed in the region of the second circular segment that projects inwardly beyond the constant cross-section of the first circular segment so as to cause a relative tilting of an axis of symmetry of the pressing sleeve with respect to a central axis of the fitting body when the assembly group is applied to the fitting body.

Such an assembly group is automatically tilted when applied to a fitting body of a press fitting, which facilitates the application of the assembly group to the fitting body. At the same time, forces occurring in the process are reduced so that damage to parts of the press fitting, in particular the fitting body, is largely avoided during assembly.

According to at least one embodiment, the first inner contour has a chamfer in the area of the first circular segment, the inside diameter of which decreases in the axial direction of the assembly group, starting from the side opposite the pressing area. An internal chamfer on the stop ring simplifies centering and application of the assembly group to the fitting body.

According to a possible embodiment, the element arranged in the region of the second circular segment has an insertion chamfer. An angle of inclination of the lead-in bevel is greater than an angle of inclination of the chamfer, in each case relative to the axis of symmetry of the assembly group, and/or a surface of the lead-in bevel is arranged offset inward in the radial direction relative to a corresponding surface of the chamfer. Such an insertion bevel supports the centering and application of the mounting group and at the same time causes it to tilt.

According to an alternative embodiment, the element arranged in the area of the second circular segment is designed as a tab projecting in the radial direction from the constant cross section of the first circular segment. Such a design is particularly easy to manufacture and ensures safe tilting of the assembly group.

According to a fourth aspect of the disclosure, a press fitting is described that includes a fitting body and an assembly group secured to the fitting body according to the third aspect. Such a press fitting can be assembled particularly easily and with relatively low forces.

In at least one embodiment, the fitting body has a circumferential groove, and the pressing sleeve has a first radially inwardly facing projection at the first axial end that engages the groove so that the pressing sleeve is directly secured to the fitting body. Such a direct attachment of a pressing sleeve directly to a fitting body prevents unintentional detachment of the pressing sleeve from the fitting body while at the same time limiting the assembly force required to apply it by tilting.

According to a fifth aspect of the disclosure, an assembly method for a press fitting, in particular the press fitting according to the fourth aspect, is described. The assembly method comprises the following steps:

Attach a stop ring to a first axial end of a ferrule, relative tilting of an axis of symmetry of the pressing sleeve with respect to a central axis of a fitting body, in the tilted state, applying the pressing sleeve with the stop ring attached thereto with the first axial end first onto a fitting body, and Locking of the pressing sleeve and/or the stop ring with a groove of the fitting body, wherein the axis of symmetry of the pressing sleeve after locking substantially coincides with the central axis of the fitting body.

The above steps can reduce a force required to engage a pressing sleeve and/or a stop ring with a fitting body so that, in particular, damage in the area of a groove of the fitting body used for engagement can be avoided.

According to at least one embodiment, the stop ring has an element projecting over a constant cross-section in a first circular segment and arranged in a region of a second circular segment which, in the step of applying the press sleeve, abuts against an elevation, in particular in the form of a rib, of the fitting body located in front of the groove in the direction of application and leads to the relative tilting of the axis of symmetry of the pressing sleeve with respect to the central axis of the fitting body. Such an element allows the press fitting to be assembled without further adaptation of the machines and/or tools used for its assembly.

Further advantageous embodiments are disclosed in the appended claims and in the following detailed description of embodiments.

BRIEF DESCRIPTION OF THE DRAWINGS

The invention is explained in detail below on the basis of various embodiment examples with reference to the attached figures. The same reference signs denote the same or similar components of different embodiments.

DETAILED DESCRIPTION

Figure 1:
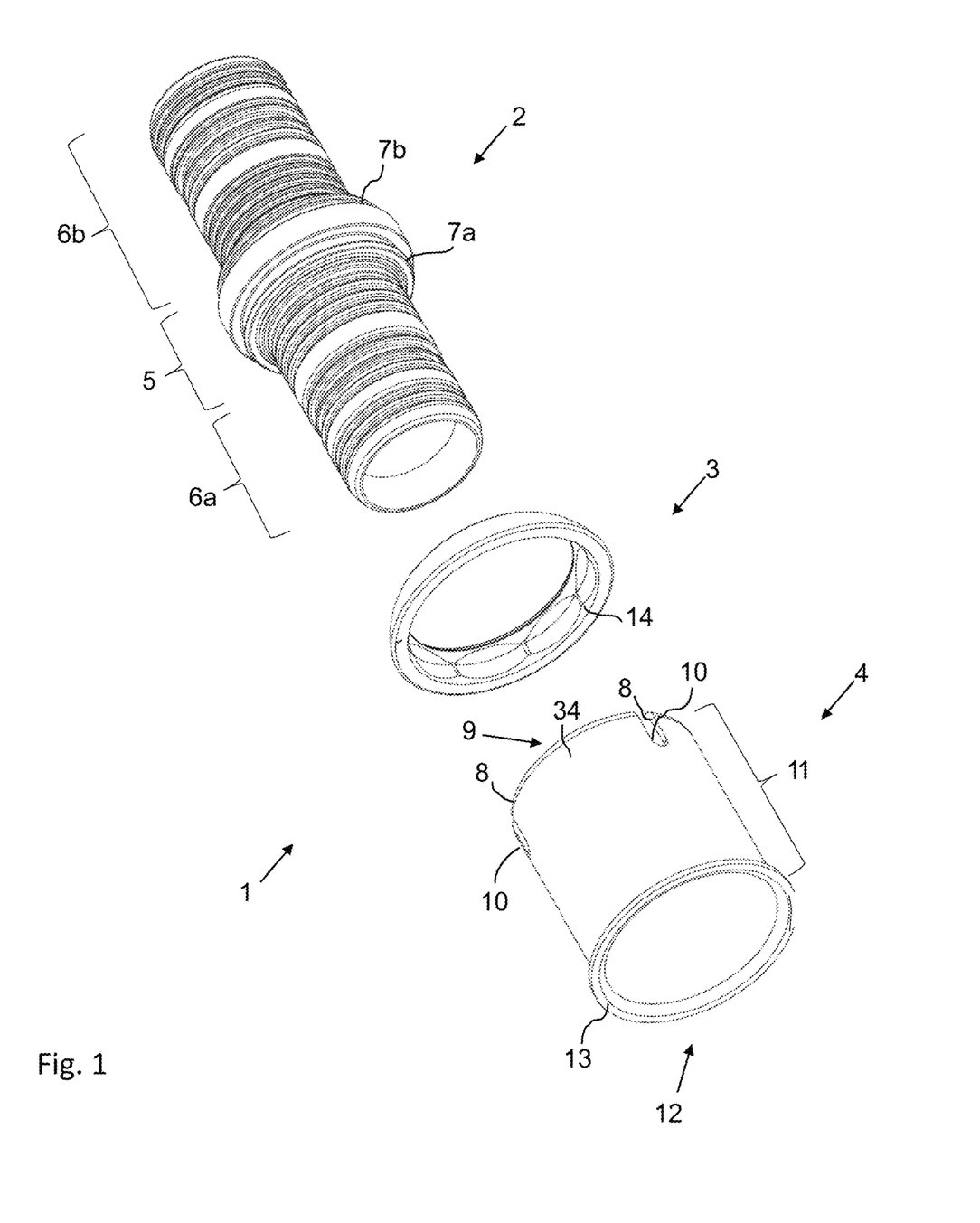
FIG. 1 shows an exploded view of a press fitting with a stop ring.

FIG. 1 shows an exploded view of a press fitting 1. The press fitting 1 has a fitting body 2, a stop ring 3 and a pressing sleeve 4.

In the embodiment example, the fitting body 2 is a straight, essentially cylindrical coupling for connecting two pipes with the same diameter. Of course, other fitting bodies, such as angled couplings, T-pieces or couplings for connecting pipes with different diameters, are also possible.

The fitting body 2 may be made from a plastic mold, such as a polymer material, or from a metal material. The surface of the fitting body 2 has a number of protrusions and grooves which ensure secure and tight pressing of a pipe not shown in FIG. 1, for example a plastic, metal or composite pipe, to the fitting body 2. For this purpose, further sealing elements not shown in FIG. 1 for reasons of clarity may be applied to the fitting body 2.

The fitting body 2 comprises a central area 5 and two opposing connection areas 6a and 6b. In the central area 5, adjacent to the respective connection area 6a and 6b, grooves 7a and 7b are provided, respectively, which serve to engage with first projections in the form of lips 8 projecting inwardly from the pressing sleeve 4.

The pressing sleeve 4 is typically made of a metal material, in particular stainless steel. To reduce a force required to engage the pressing sleeve 4 with the fitting body 2, a first axial end 9 of the pressing sleeve 4 is provided with a plurality of slots 10. The slots 10 facilitate an expansion of the first axial end 9 when the pressing sleeve 4 is pushed onto the fitting body 2. Thereby, the first axial end 9 of the pressing sleeve 4 points in the direction of the central area 5 of the fitting body 2 and can thus also be referred to as the proximal end. Before the pressing sleeve 4 is applied to the fitting body 2, the stop ring 3 is first mounted on it.

The stop ring 3 is typically made of a plastic tool, in particular a polymer material, and delimits a pressing area 11 of the pressing sleeve 4 at the first axial end 9 of the pressing sleeve 4. At the opposite, distal or second axial end 12 of the pressing sleeve 4, the pressing area 11 is delimited in the illustrated embodiment example by a second projection in the form of a flange 13 of the pressing sleeve 4 itself. During pressing of the press fitting 1, pressing jaws of a pressing tool not shown in the figures act on the pressing area 11 of the pressing sleeve 4 and thus establish a positive connection between the fitting body 3, a pipe end inserted into the press fitting and the pressing sleeve 4.

In order to securely fasten the stop ring 3 to the pressing sleeve 4 even before the pressing sleeve 4 is mounted on the fitting body 2, the stop ring 3 has an inner contour 14 on the sleeve side which is used to create a clamp connection.

Figure 2:
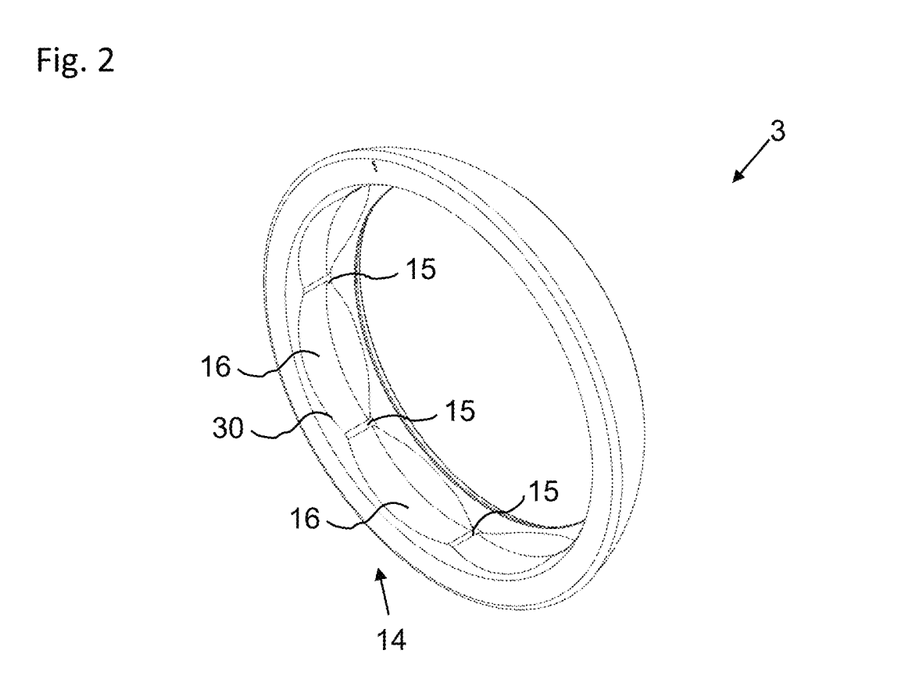
FIGS. 2, 3 and 4 show different representations of a stop ring according to FIG. 1.
Figure 3:
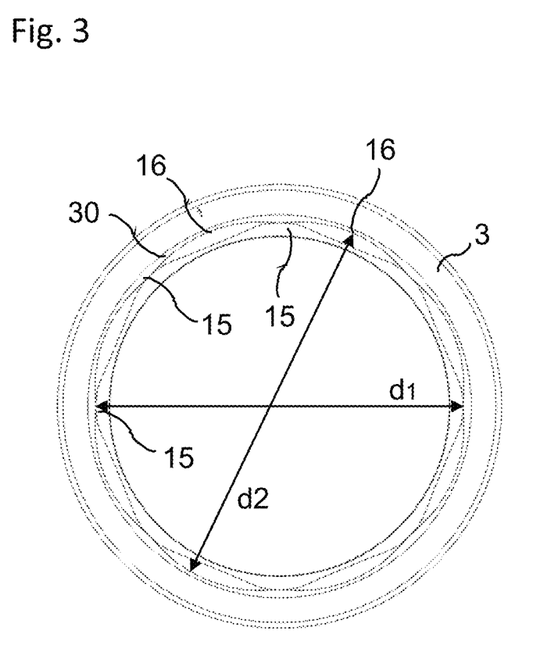
Figure 4:
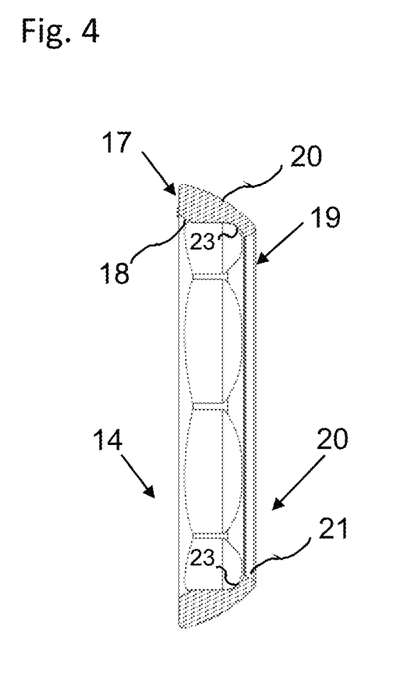

As can be seen in FIGS. 2 to 4, the inner contour 14 in the illustrated embodiment example has a total of eight protruding, first areas 15. The stop ring 3 can deform slightly when it is pushed onto the first axial end 9 of the pressing sleeve 4. In particular, the first areas 15 create a tight fit.

Figure 6:
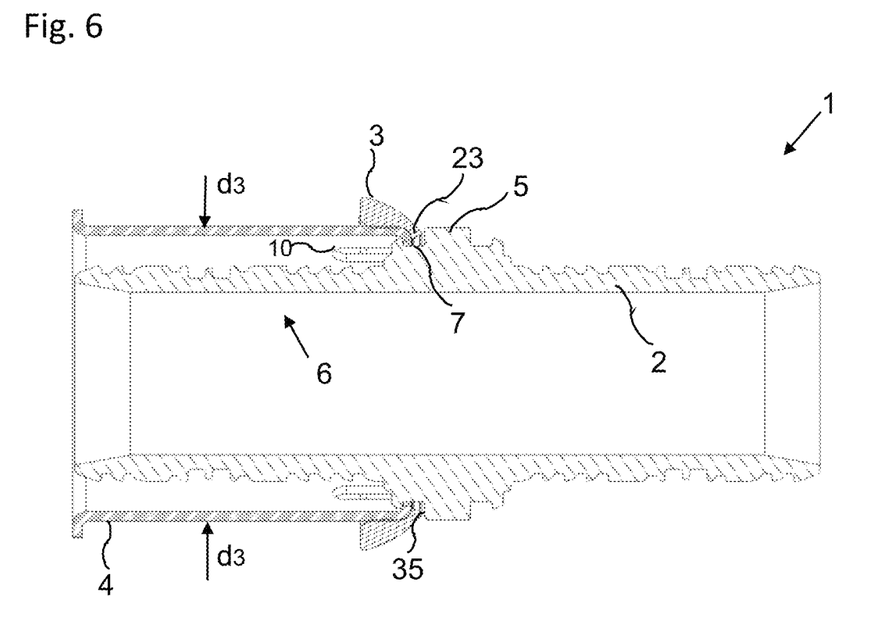
FIG. 6 shows a cross-section through the press fitting according to FIG. 5.

For this purpose, a first inner diameter $d_1$ of a remaining clear area between the first areas 15 is dimensioned so that it is smaller than an outer diameter $d_3$ of the pressing sleeve 4 shown in FIG. 6 plus a possible negative manufacturing tolerance. For example, a pressing sleeve for a tube diameter of 25 mm diameter may have a tolerance range of approximately 0.25 mm, i.e. approximately 1% of the nominal diameter. In this case, the first inner diameter $d_1$ between end faces of the first areas 15 is dimensioned in such a way that even with a minimum permissible outer diameter of the pressing sleeve 4, an overlap of 0.1 mm remains for providing a clamping force. Conversely, there is an overlap of 0.35 mm for a maximum permissible outer diameter of the pressing sleeve 4.

In contrast, a second inner diameter $d_2$ between two opposing, most recessed parts of the second areas 16 is dimensioned so large that in each case a clearance remains between an outer surface of the pressing sleeve 4 and a corresponding second area 16 of the inner contour 14 of the stop ring 3. For example, a minimum clearance of 0.1 mm remains within the tolerance range in the case of a maximum outer diameter of the pressing sleeve 4 and a maximum clearance of 0.35 mm remains within the tolerance range in the case of a minimum outer diameter of the pressing sleeve 4.

In the embodiment example according to FIGS. 1 to 3, the first areas 15 are connected to the second areas 16 by transition areas 30 with an arc-shaped cross section, in which the inner diameter of the stop ring 3 increases continuously. The advantage of this design is that the arcuate transition regions 30 are mechanically particularly stable. Furthermore, the protruding first areas 15 are designed to be so wide that they do not completely enter the slots 10 of the pressing sleeve 4 when the stop ring 3 is fitted.

In the cross-section according to FIG. 4, it can be seen that a first side 17 of the stop ring 3, which faces the pressing area 11 in the assembled state, has a first chamfer 18. The first chamfer 18 enables centering and easy fitting of the stop ring 3 onto the first axial end 9 of the pressing sleeve 3.

Furthermore, it can be seen that an opposite second side 19 of the stop ring 3, which faces the central region 6 of the fitting body 2 in the assembled state, has a fitting-side inner contour 20 with a second chamfer 21. The second chamfer 21 serves, among other things, to center an assembly group comprising the stop ring 3 and the pressing sleeve 4 when it is mounted on the fitting body 2. An arcuate outer contour 22 of the stop ring 3 continuously connects the outer diameter of the first side 17 to the outer diameter of the second side 19, so that there are no steps in the cross section. The sleeve-side inner contour 14 and the fitting-side inner contour 20 are separated from each other by an inwardly projecting third projection, which at the same time forms an open bottom face 23 of the sleeve-side inner contour 14 and limits a maximum insertion depth of the pressing sleeve 4.

Figure 5:
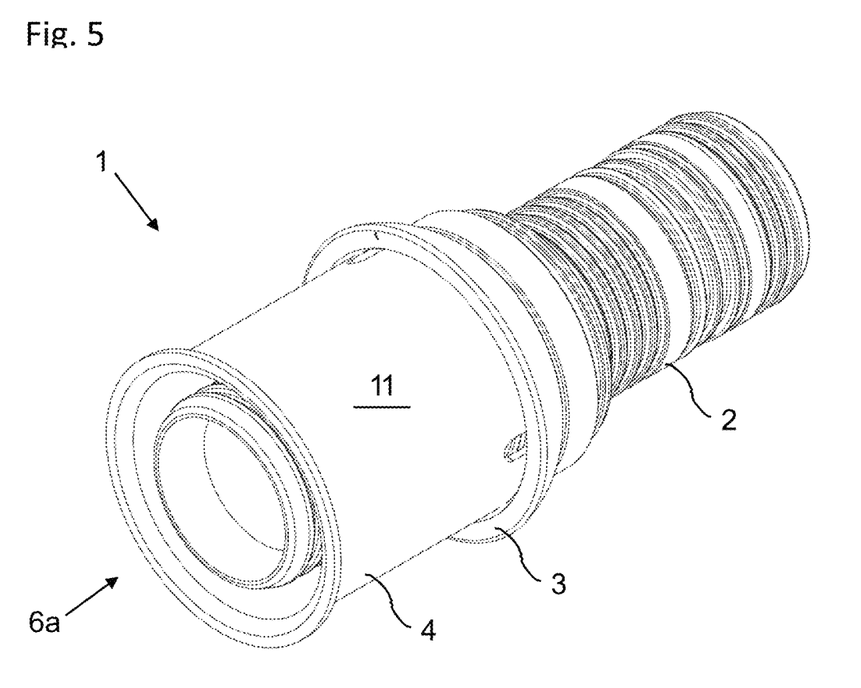
FIG. 5 shows the press fitting according to FIG. 1 in the assembled state.

In the assembled state according to FIGS. 5 and 6, the third projection or the open bottom face 23 of the stop ring 3, as shown in the cross-section of FIG. 6, can engage fully or partially in the groove 7 of the fitting body 2. If appropriately dimensioned, it can also rest on a surface of the fitting body 2 outside the groove 7. In the embodiment example, it limits the fitting depth of the assembly when the pressing sleeve 4 is applied to the connection area 6a by the second side 19 of the stop ring 3 abutting against an end face 35 of the central area 5.

Figure 7:
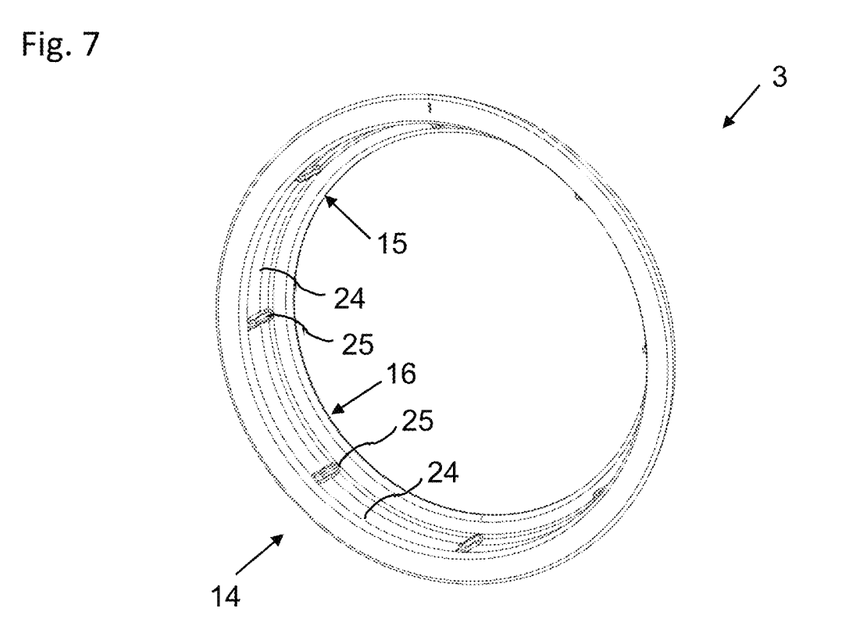
FIG. 7 shows an alternative design of a stop ring.

FIG. 7 shows an alternative design of a sleeve-side inner contour 14 of a stop ring 3. Deviating from the stop ring 3 according to FIGS. 1 to 4, the inner contour 14 according to FIG. 7 comprises a substantially cylindrical inner surface 24 and webs 25 arranged thereon. In the embodiment example, a total of eight such webs 25 are present, which form the first areas 15 of the stop ring 1. The intermediate sections of the cylindrical inner surface 24 form the second areas 16. With regard to their dimensions, reference is made to what has been said above.

Figure 8:
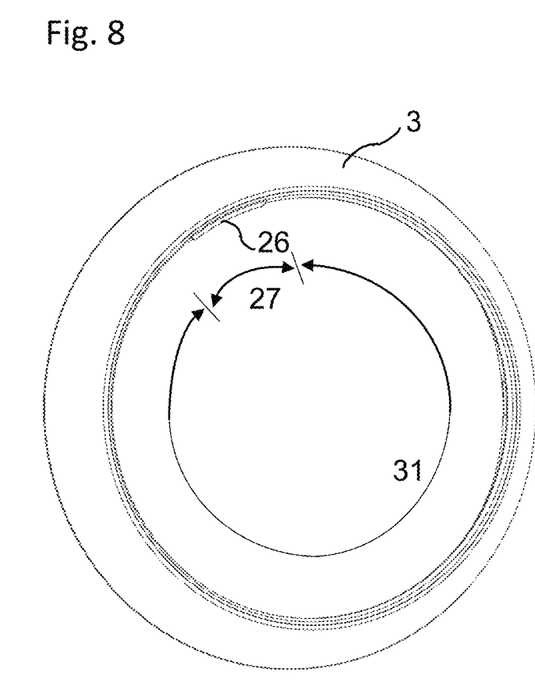
FIGS. 8 and 9 show different views of another stop ring.
Figure 9:
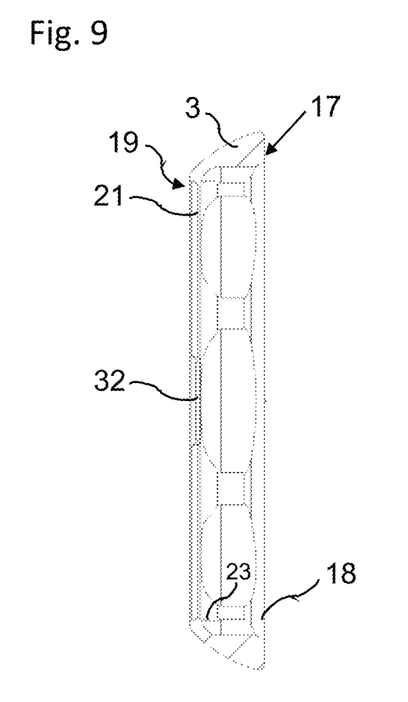

In the following, with reference to FIGS. 8 to 10, a further aspect of the fitting-side inner contour 20 according to a further embodiment of a connection ring is described. In this embodiment, the fitting-side inner contour 20 has a protruding element 26 arranged in a relatively small circular segment 27 of the stop ring 3. In the remaining part, corresponding to a larger circular segment 31, the stop ring 3 has a constant cross-section. In this context, protruding means that a surface of the element 26 facing the center of the stop ring 3 protrudes beyond a surrounding surface of the fitting-side inner contour 20 or the constant cross section in the circular segment 31.

Figure 10:
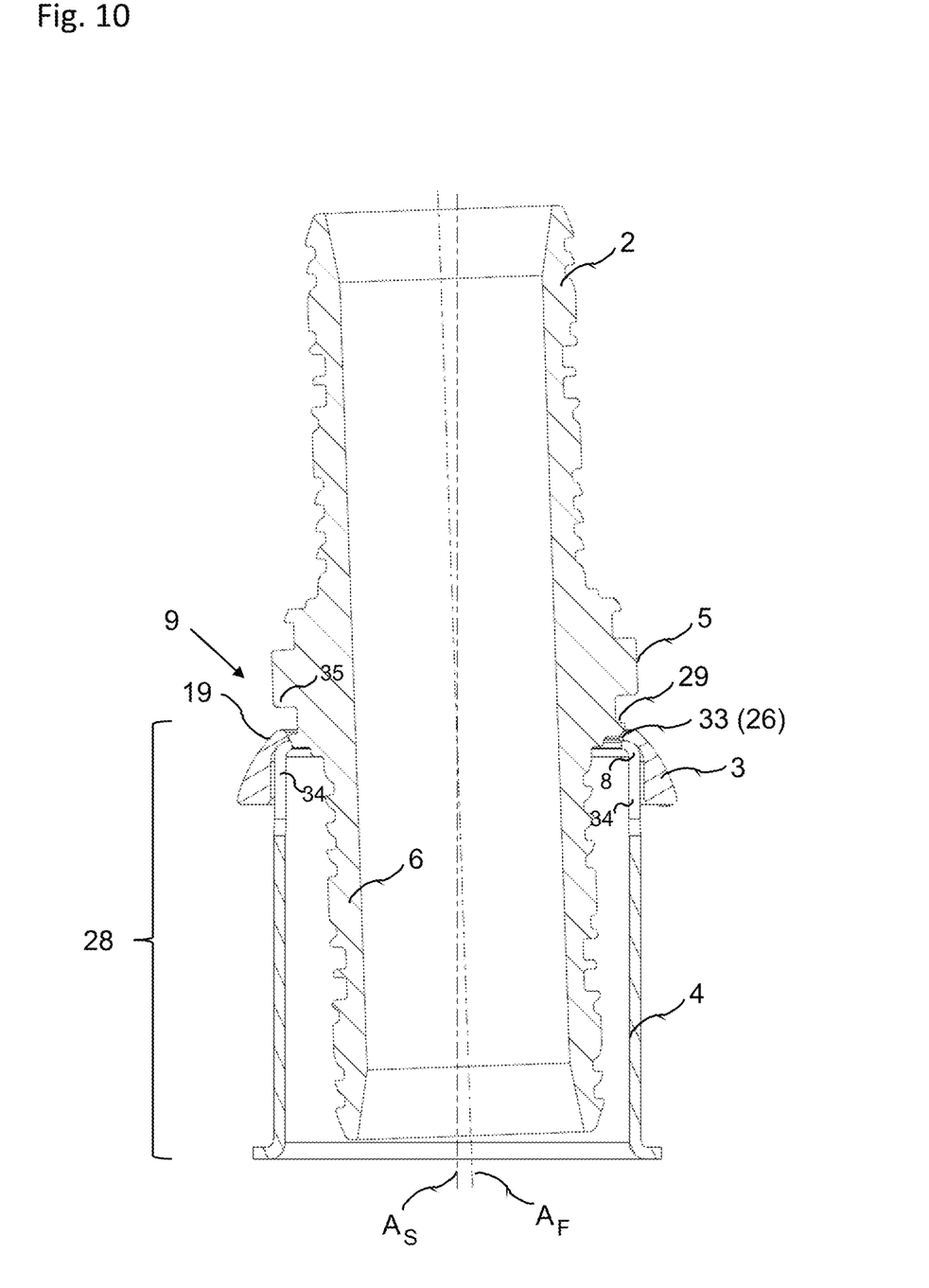
FIG. 10 shows the assembly of a mounting group on a fitting body.

For example, as shown in FIG. 10, the element 26 may be formed as a tab 33 projecting radially inwardly from the inner circumference of the stop ring 3, that is, perpendicular to its axis of symmetry. Alternatively, it is also possible to form the element 26 as shown in FIGS. 8 and 9 as an insertion chamfer 32 that can also form part of the second chamfer 21. In this case, an obliquely inwardly inclined surface of the insertion chamfer 32 in the region of the smaller circular segment 27 in which the element 26 is formed is either displaced inwardly parallel to a surface of the chamfer 21 or has a greater inclination in the insertion direction than the second chamfer 21 of the fitting-side inner contour 20.

In particular, the element 26 serves to cause a relative tilting of their axes when the pressing sleeve 4 with the connection ring 3 fitted thereon is placed on a connection area 6 of the fitting body 2.

In the embodiment shown in FIG. 10, an assembly group 28, comprising the pressing sleeve 4 and the connection ring 3, stands upright and with its first axial end 9 pointing upwards on a flat surface, such as a holding device of a machine tool. Next, a fitting body 2 with a downwardly facing connection portion 6 is inserted substantially vertically from above into the opening of the assembly group 28. Here, the axial directions of the mounting group 28 and the fitting body 2 initially coincide.

As soon as the second side 19 of the fitting ring 3 encounters a circumferential rib 29 located in front of the groove 7, the element 26, in the form of a tab 33 in FIG. 10, causes an asymmetrical distribution of force which, as shown, results in a slight relative tilting of the central axis $A_F$ of the fitting area 6 with respect to the axis of symmetry $A_S$ of the assembly group 28 or of the pressing sleeve 4. For example, the fitting body 2 can be tilted by approximately 2 to 5°.

This has the effect that the segments 34 of the pressing sleeve 4 formed between the slots 10 of the pressing sleeve 4 with lips 8 formed thereon expand slightly one after the other in time during latching. This considerably reduces the forces required to connect the assembly group 28 to the fitting body 2 and thus facilitates the insertion of the connection area 6 into the assembly group 28.

Under test conditions, the assembly forces for a press fitting 1 for a nominal pipe diameter of 25 mm could be reduced to a press-in force of 242 N by an offset or tilted insertion of the connection area 6 into the assembly group 28, compared to a press-in force of approximately 2100 N for a coaxial press-in, which considerably facilitates the assembly of the press fitting 1. For a nominal pipe diameter of 32 mm, the press-in force was reduced from 1500 N to 314 N. This reduction in the forces occurring during assembly has the additional advantage that damage to the fitting body 2 can be avoided, especially when plastic materials are used for the fitting body 2.

As soon as the assembly process is completed, i.e. as soon as the second side 19 of the stop ring 3 abuts against an end face 35 formed by the central area 5, the pressing sleeve 4 and the fitting body 2 align coaxially again. Thus, the offset or tilted application of the assembly group 28 does not adversely affect its alignment or the secure attachment of the pressing sleeve 4 to the fitting body 2.

Figure 11:
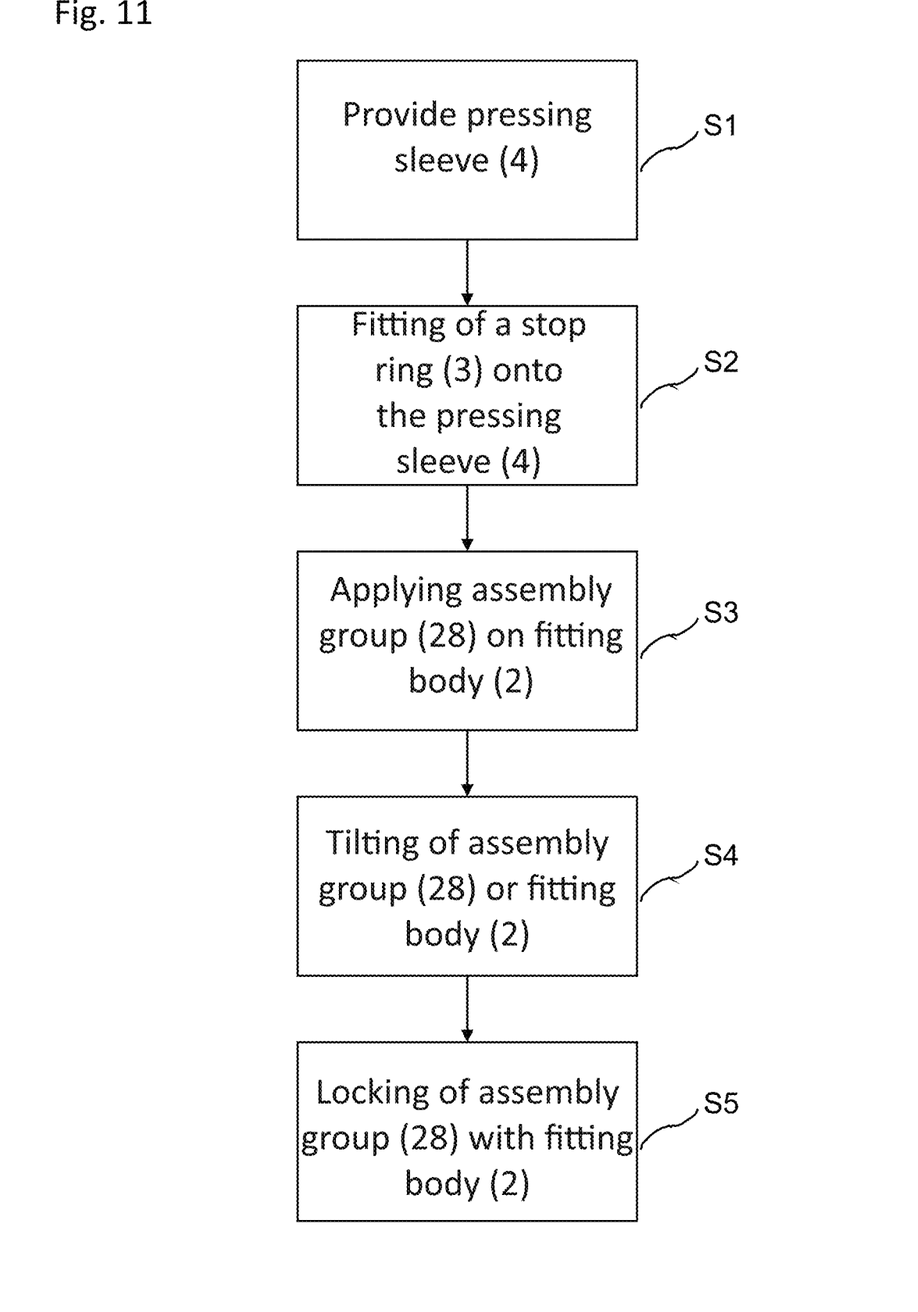
FIG. 11 schematically shows a method of assembling a press fitting.

FIG. 11 schematically shows the steps of a process for assembling a press fitting 1.

First, a pressing sleeve 4 with a predetermined nominal diameter is provided in a step S1. This diameter can vary within a predetermined tolerance range by a specific negative and/or positive tolerance value. Preferably, the pressing sleeve 4 has one or more protrusions, such as lips 8 in particular, for direct engagement with a fitting body 2.

In a subsequent step S2, a stop ring 3 is fitted onto the pressing sleeve 4 at a first axial end 9. Preferably, this is fastened to the pressing sleeve 4, for example by providing raised first areas 15 and recessed second areas 16, which result in the stop ring 3 jamming against the pressing sleeve 4. Alternatively, other connections, in particular form-fit connections, are also possible.

In a further step S3, the assembly group 28 of the pressing sleeve 4 produced in this way, with the stop ring 3 attached to it, is applied to a connection area 6 of a fitting body 2. This can be done, for example, by an industrial automatic fitting machine.

In a step S4, the longitudinal axes of the fitting body 2 and the assembly group 28 are tilted relative to each other. This can be ensured, for example, by appropriate control of an automatic placement machine or a press die or, as previously described with reference to FIGS. 8 to 10, by provision of a corresponding fitting-side inner contour 20 with a protruding element 26.

Subsequently, in a step S5, the assembly group 28 is further pushed or pressed onto the fitting body 2, and the pressing sleeve 4 is locked to the fitting body 2, for example by engaging lips 8 in a corresponding groove 7 of the fitting body 2.

In the described embodiment examples, the stop ring 3 remains intact during the actual pressing of the pressing sleeve 4 with a pipe end, since the pressing tool does not exert any force on the stop ring 3 in a radial pressing direction. Provided that an indication of the pressing is desired, the described press fitting 1 can be provided, for example, with a tubular banderole as a pressing identification. The application and advantages of such a band 114, as shown for example in FIG. 12, have already been described in detail in DE 2018 109 555 B3. To avoid repetition, reference is made to the disclosure thereof and the same is incorporated by reference in the present description.

The sleeve-side inner contour 14 described above on the side of the stop ring 3 facing the pressing area 11 and the fitting-side inner contour 20 on the side of the stop ring 3 facing the fitting body 2 can be combined with each other as described above. However, each of the inner contours 14 and 20 also has the described effects and advantages on its own and can therefore also be implemented individually.

LIST OF REFERENCE SIGNS 1. press fitting
2. fitting body
3. connection ring
4. pressing sleeve
5. central area
6, 6a, 6b. connection area
7, 7a, 7b. groove
8. lip (first protrusion)
9. first axial end
10. slot
11. press area
12. second axial end
13. flange (second protrusion)
14. (sleeve side) inner contour
15. first area
16. second area
17. first side
18. first chamfer
19. second side
20. (fitting side) inner contour
21. second chamfer 22. outer contour
23. open bottom face (third protrusion)
24. inner surface of the cylinder
25. web
26. element
27. (small) circular segment
28. assembly group
29. rib
30. transition area
31. (larger) circular segment
32. insertion chamfer
33. tab
34. segment (of the pressing sleeve)
35. end face

The invention claimed is:

1. A press fitting for a pipe connection, comprising:
a fitting body for connecting the press fitting to a pipe;
a substantially cylindrical pressing sleeve fixed to the fitting body and having a pressing area; and
a stop ring fixed to the pressing sleeve, which limits the pressing area in an axial direction of the pressing sleeve, wherein the stop ring has a substantially cylindrical inner contour only consisting of alternating protruding first areas and second areas arranged between and receding from the first areas,
wherein the first areas of the stop ring encompass an outer contour of the pressing sleeve in a clamping manner, and
wherein the second areas of the stop ring are spaced from the outer contour of the pressing sleeve.

2. The press fitting according to claim 1, wherein:
the pressing sleeve has a predetermined outside diameter $d_3$ with a predetermined tolerance range;
an inside diameter $d_1$ between the first areas is smaller than the predetermined outside diameter $d_3$ minus a negative tolerance; and
an inside diameter $d_2$ between the second areas is larger than the predetermined outside diameter $d_3$ plus a positive tolerance.

3. The press fitting according to claim 2, wherein:
the predetermined tolerance range is approximately 1% of a diameter of a pipe to be connected to the press fitting and/or at least 0.2 mm;
the inside diameter $d_1$ between the first areas is smaller by about 0.5% and/or at least 0.1 mm than the predetermined outside diameter $d_3$ minus the negative tolerance; and
the inside diameter $d_2$ between the second areas is approximately 0.5% and/or at least 0.1 mm larger than the predetermined outside diameter $d_3$ plus the positive tolerance.

4. The press fitting according to claim 1, wherein:
the fitting body has a circumferential groove; and
the pressing sleeve has, at a first axial end on a fitting side, a first projection or a lip pointing inwards in a radial direction, which engages in the groove in an assembled state fixed to the fitting body, so that the pressing sleeve is fixed directly to the fitting body.

5. The press fitting according to claim 4, wherein the pressing sleeve has, at a pipe-side second axial end, a second projection or a flange, which points outwards in the radial direction and delimits a pressing region in the direction of the second axial end of the pressing sleeve.

6. The press fitting according to claim 4, wherein the pressing sleeve includes one or a plurality of slots extending from the first axial end towards the pressing area.

7. The press fitting according to claim 4, wherein:
the stop ring is arranged at the first axial end of the pressing sleeve and limits the pressing area in the direction of the first axial end of the pressing sleeve; and
the stop ring has a third projection or an open bottom face pointing inward in the radial direction, which engages in the groove of the fitting body in the assembled state fixed to the fitting body.

8. The press fitting according to claim 1, wherein the first areas are connected to the second areas by arcuate transition areas.

9. The press fitting according to claim 1, wherein the second areas are formed by a substantially cylindrical inner surface of the stop ring and the first areas are formed by webs projecting from the inner surface.

10. The press fitting according to claim 1, wherein the connection ring comprises a plastic material or a polymer material.

11. The press fitting according to claim 1, wherein the pressing sleeve comprises a metal material or stainless steel.

12. The press fitting according to claim 1, wherein the fitting body comprises a metal material, a plastic material and/or a polymer material.

13. The press fitting of claim 1, comprising an assembly group including the substantially cylindrical pressing sleeve and the stop ring fixed to a first axial end of the pressing sleeve.

14. An assembly group for a press fitting, comprising:
a substantially cylindrical pressing sleeve having a pressing area; and
a stop ring fixed to a first axial end of the pressing sleeve, which ring limits the pressing area in an axial direction of the pressing sleeve,
wherein the stop ring has a substantially cylindrical inner contour only consisting of alternating protruding first areas and second areas arranged between and receding from the first areas,
wherein the first areas of the stop ring encompass an outer contour of the pressing sleeve in a clamping manner, and
wherein the second areas of the stop ring are spaced from the outer contour of the press sleeve.

* * * * *